G. C. WEIDENHAMMER.
GRATER.
APPLICATION FILED MAY 23, 1911.
1,033,642.
Patented July 23, 1912.
2 SHEETS—SHEET 1.
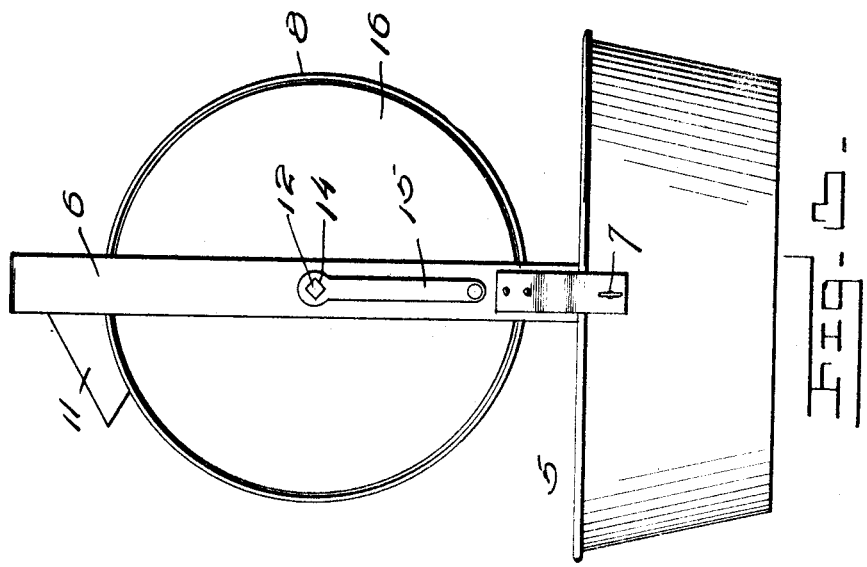
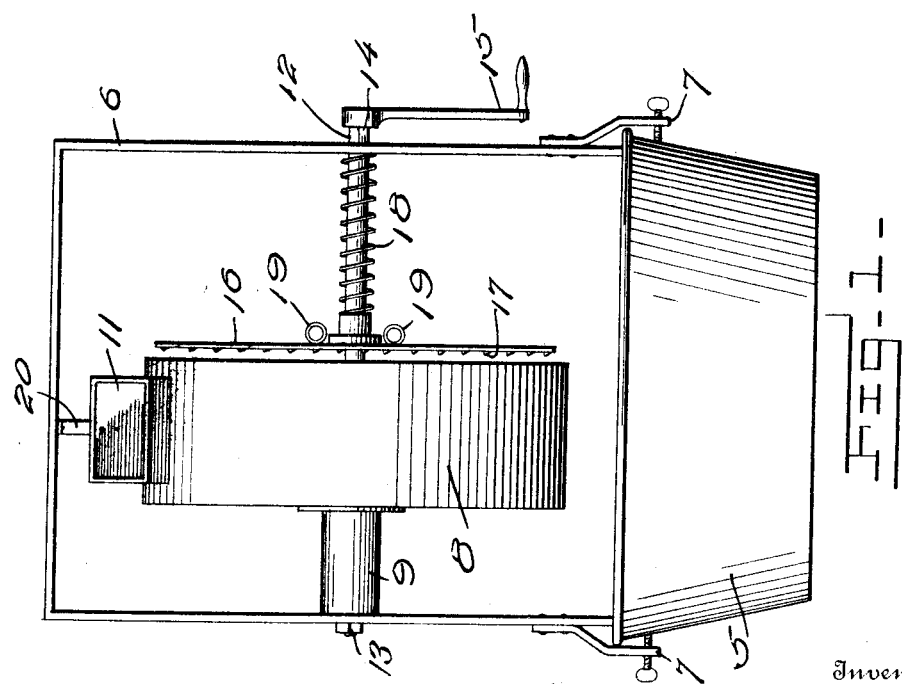
Inventor
George C. Weidenhammer,
Witnesses
By Victor J. Evans
Attorney G. C. WEIDENHAMMER.
GRATER.
APPLICATION FILED MAY 23, 1911.
1,033,642.
Patented July 23, 1912.
2 SHEETS—SHEET 2.
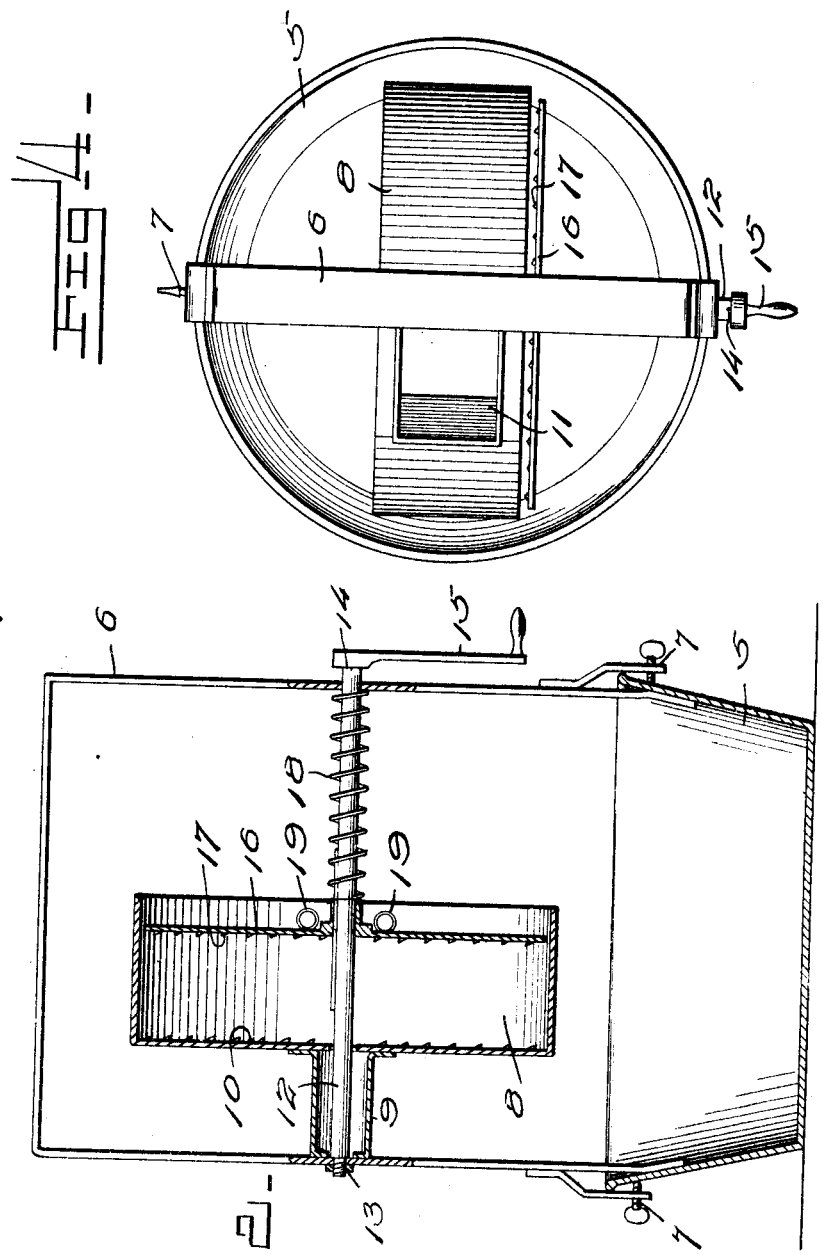
Witnesses
Inventor
George C. Weidenhammer,
By Victor J. Evans
Attorney

UNITED STATES PATENT OFFICE.

GEORGE C. WEIDENHAMMER, OF ST. PAUL, MINNESOTA.

GRATER.

1,033,642.   Specification of Letters Patent.   Patented July 23, 1912.

Application filed May 23, 1911. Serial No. 628,993.

*To all whom it may concern:*

Be it known that I, GEORGE C. WEIDENHAMMER, a subject of the King of Great Britain, residing at St. Paul, in the county of Ramsey and State of Minnesota, have invented new and useful Improvements in Graters, of which the following is a specification.

The invention relates to graters, and more particularly to the class of rotary graters.

The primary object of the invention is the provision of a grater in which vegetables may be cut into small pieces or thoroughly grated, the grater being supported upon a frame which is capable of being detachably mounted upon a pail or other receptacle, or upon a table.

Another object of the invention is the provision of a grater which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a pail, showing the grater mounted thereon constructed in accordance with the invention. Fig. 2 is a vertical longitudinal sectional view through the grater. Fig. 3 is an edge elevation of the grater. Fig. 4 is a top plan view thereof.

Similar reference characters indicate corresponding parts throughout the several views of the drawings.

Referring to the drawings by numerals, 5 designates a saucepan or pail of the ordinary well-known construction, and on which, in this instance, is shown mounted the grater, presently described. However, it is to be understood, of course, that the grater may be mounted on any other cooking utensil or upon a table.

The grater comprises an inverted U-shaped frame 6, preferably of metal, having near opposite ends clamping devices 7, whereby the frame may be mounted upon the mouth edge of a pail or other receptacle, and clamped thereto as will be obvious.

Mounted centrally within the frame 6 is a stationary circular-shaped shell or casing 8, the same being provided with a central boss 9 which is riveted or otherwise secured to one limb of the inverted U-shaped frame 6. The inner face of the side wall of the shell or casing 8 is formed with a grating surface 10, and at the top of the said shell or casing is formed a hopper 11, through which is introduced vegetables or material to be grated interiorly of the hopper.

Passed centrally through the shell or casing 8 and the boss 9 is a revoluble shaft 12, the same being journaled in the side limbs of the frame 6, one end of the shaft being formed with screw threads engaged by a lock nut 13, thereby detachably mounting the said shaft in the frame 6, and its opposite end is formed with a squared portion 14, on which is detachably mounted a crank handle 15, whereby the shaft 12 may be rotated in the usual manner.

Slidably keyed upon the shaft 12 is a rotary grating disk 16, having an inner grating surface 17 coöperative with the grating surface 10 in the shell or casing 8, the disk being automatically moved toward the casing or shell 8 by means of a coiled expansion spring 18, surrounding the said shaft 12, one end of the spring having its bearing against the disk 16, while its opposite end has its bearing against the adjacent limb of the inverted U-shaped frame 6.

The outer face of the rotary grating disk 16 is formed with finger holds 19, whereby the disk may be manually moved away from the shell or casing 8 against the resistance of the spring 18, thereby permitting access to be had to the interior of the shell or casing 8 for the cleaning of the same, and also the rotary disk 16. Furthermore, it is noted that upon the removal of the lock nut 13 from the shaft 12, the latter can be pulled out of the frame, whereby the rotary disk 16 will become detached, so that it may be conveniently cleaned, or the grating surface sharpened in any well-known manner.

Fixed to and depending from the inverted U-shaped frame 6 and also one side of the hopper is a brace 20 which rigidly holds the grater in the frame.

In the operation of the device, the material to be grated is introduced through the hopper 11 into the casing or shell 8, and upon the turning of the crank handle 15, the grating surface of the rotary disk 16 will coöperate with the grating surface 9 of the said shell or casing 8, so as to act upon the material for the shredding or grating of the same, and on the discharge thereof, the same will fall into the pail or pan 5 for the collection thereof.

What is claimed is:

A grater of the class described comprising an inverted U-shaped frame, a rotary shaft journaled horizontally in said frame, a cylinder loosely surrounding the shaft and fixed to the frame and provided with an open side, a boss projecting from the closed side of said cylinder and secured to said frame for preventing rotation of said cylinder, and a disk keyed to the shaft for longitudinal movement thereon interiorly of the cylinder, means working against the disk to force the same inwardly of the cylinder, a plurality of outstretched spurs formed on the disk upon the side facing the cylinder, a hopper rising from the periphery of the cylinder and communicating therewith, a brace depending from said frame and secured to said hopper for rigidly securing said cylinder in said frame, and a turning handle fixed to one end of said shaft.

In testimony whereof I affix my signature in presence of two witnesses.

GEORGE C. WEIDENHAMMER.

Witnesses:
R. M. CL IL,
THEO. C. KLATT.

---

Copies of this patent may be obtained for five cents each, by addressing the "Commissioner of Patents, Washington, D. C."